United States Patent [19]

Wada et al.

[11] Patent Number: 5,581,721
[45] Date of Patent: Dec. 3, 1996

[54] DATA PROCESSING UNIT WHICH CAN ACCESS MORE REGISTERS THAN THE REGISTERS INDICATED BY THE REGISTER FIELDS IN AN INSTRUCTION

[75] Inventors: Hideo Wada; Katsumi Takeda, both of Hadano; Yasuhiro Inagami, Kodaira; Hiroaki Fujii, Hadano, all of Japan

[73] Assignee: Hitachi, Ltd., Tokyo, Japan

[21] Appl. No.: 600,155

[22] Filed: Feb. 12, 1996

Related U.S. Application Data

[63] Continuation of Ser. No. 162,252, Dec. 7, 1993.

[30] Foreign Application Priority Data

Dec. 7, 1992 [JP] Japan ..................... 4-326435

[51] Int. Cl.[6] .......................... G06F 9/38; G06F 12/00
[52] U.S. Cl. ............................. 395/376; 395/412
[58] Field of Search ..................... 395/375, 412

[56] References Cited

U.S. PATENT DOCUMENTS

| | | | |
|---|---|---|---|
| 4,340,932 | 7/1982 | Bakula et al. | 395/402 |
| 5,111,389 | 5/1992 | McAuliffe et al. | 395/413 |
| 5,179,674 | 1/1993 | Williams et al. | 395/414 |
| 5,247,645 | 9/1993 | Mirza et al. | 395/405 |
| 5,278,963 | 1/1994 | Hattersley et al. | 395/414 |
| 5,388,235 | 2/1995 | Ikenaga et al. | 395/375 |
| 5,437,043 | 7/1995 | Fujii et al. | 395/800 |
| 5,438,669 | 8/1995 | Nakazawa et al. | 395/375 |

FOREIGN PATENT DOCUMENTS

| | | |
|---|---|---|
| 0476722 | 3/1992 | European Pat. Off. |
| 0543366 | 5/1993 | European Pat. Off. |
| 166649 | 10/1982 | Japan |

OTHER PUBLICATIONS

Hennessy et al.; "Computer Architecture: A Quantitative Approach"; pp. 450–454 (1990).
Rau et al.; "Register Allocation for Software Pipeland Loops"; pp. 283–299 (1992).
Tirumalai et al; "Parallelization of Loops with Exits On Pipelined Architectures" (1990).
Proceedings Supercomputing '92, "Pseudo Vector Processor Based on Register–Windowed Superscaler Pipeline", N. Kisaburo, et al., Minneapolis, Minnesota, Nov. 16–20, 1992, IEEE Computer Society Press.

Primary Examiner—William M. Treat
Assistant Examiner—Kenneth R. Coulter
Attorney, Agent, or Firm—Antonelli, Terry, Stout & Kraus

[57] ABSTRACT

The data processing unit includes a greater number of physical floating point registers than the number of floating point registers accessible by an instruction, window start point register having a plurality of bits, 1-bit window start pointer valid register, conversion apparatus for converting a floating point register number in an instruction to a physical floating point register number when the value of the window start pointer valid register is 1, and changing the pattern of this conversion by a value obtained from the value of the window start pointer register or the value of a window stride designated in a specific instruction, and the value of the window start pointer register. Also provided is an instruction controller for detecting a window start pointer set instruction for setting a value to the window start pointer register, a floating point register pre-load instruction for converting the floating point register number in the instruction to a physical floating point register number by the conversion circuit from the value obtained from the value of the window start pointer register and the value of the window stride, and storing a main memory data in the physical floating point register indicated by the physical floating point register number.

16 Claims, 9 Drawing Sheets

FIG. 5A

WINDOW START POINTER SET INSTRUCTION

| INSTRUCTION CODE | UNUSED | u | v |
|---|---|---|---|

FIG. 5B

FLOATING POINT REGISTER PRELOAD INSTRUCTION

| INSTRUCTION CODE | WINDOW STRIDE | FR NO. | GR NO. | INCREMENT |
|---|---|---|---|---|

FIG. 5C

FLOATING POINT REGISTER POSTSTORE INSTRUCTION

| INSTRUCTION CODE | WINDOW STRIDE | FR NO. | GR NO. | INCREMENT |
|---|---|---|---|---|

FIG. 6

| No. | RELATIVE ADDRESS | INSTRUCTION STRING | OPERATION |
|---|---|---|---|
| 1 | LOOP | FLDM 8(GR1),FR8 | 8-BYTE DATA IS READ OUT FROM MMA INDICATED BY GR1 AND STORED IN FR8. THAT IS, A(i) IS SET IN THE FR8. THEN THE VALUE OF GR1 IS ADDED WITH 8. THAT IS, GR1 INDICATES MMA OF B(i+1). |
| 2 | | FMLT FR10,FR8,FR7 | THE PRODUCT OF THE VALUE OF FR 8 BY THE VALUE OF 7 IS STORED IN FR 10. THAT IS, B(i)*S ENTERS FR 10. |
| 3 | | FSTM 8(GR3),FR10 | THE VALUE OF FR 10 IS STORED IN MMA INDICATED BY GR 3, THAT IS, B(i)*S ENTERS A(i). THEN 8 IS ADDED TO THE VALUE OF GR 3. THAT IS, GR 3 INDICATES MMA OF A(i+1). |
| 4 | | BCNT GR4,LOOP | 1 IS SUBTRACTED FROM THE VALUE OF GR 4. IF THE SUBTRACTED RESULT IS NOT ZERO, THE PROGRAM BRANCHES INTO AN ADDRESS "LOOP". THAT IS, IF i<N, THEN THE PROGRAM RETURNS TO "LOOP". |

GR : GENERAL REGISTER.
FR : FLOATING POINT REGISTER.
MMA : MAIN MEMORY ADDRESS.

FIG. 7

| No. | RELATIVE ADDRESS | INSTRUCTION STRING | OPERATION |
|---|---|---|---|
| 1 | LOOP | FLDM 8(GR1),FR12 | B(i)→FR12 |
| 2 | | FLDM 8(GR1),FR13 | B(i+1)→FR13 |
| 3 | | FLDM 8(GR1),FR14 | B(i+2)→FR14 |
| 4 | | FLDM 8(GR1),FR15 | B(i+3)→FR15 |
| 5 | | FMLT FR20,FR12,FR7 | B(i)' S→FR20 |
| 6 | | FMLT FR21,FR13,FR7 | B(i+1)' S→FR21 |
| 7 | | FMLT FR22,FR14,FR7 | B(i+2)' S→FR22 |
| 8 | | FMLT FR23,FR15,FR7 | B(i+3)' S→FR23 |
| 9 | | FSTM 8(GR3),FR20 | FR20→A(i) |
| 10 | | FSTM 8(GR3),FR21 | FR21→A(i+1) |
| 11 | | FSTM 8(GR3),FR22 | FR22→A(i+2) |
| 12 | | FSTM 8(GR3),FR23 | FR23→A(i+3) |
| 13 | | BCNT GR4,LOOP | IF i<N/4 THEN RETURNS TO "LOOP" |

FIG. 8

| No. | RELATIVE ADDRESS | INSTRUCTION STRING | OPERATION |
|---|---|---|---|
| 1 | | FWSTPS 0,0 | FWSTP=0 |
| 2 | | FLDPRM 8(GR1),FR8,0 | B(1)→PFR<0,8> |
| 3 | | FLDPRM 8(GR1),FR8,1 | B(2)→PFR<1,8> |
| 4 | | FLDPRM 8(GR1),FR8,2 | B(3)→PFR<2,8> |
| 5 | | FLDPRM 8(GR1),FR8,3 | B(4)→PFR<3,8> |
| 6 | | FLDPRM 8(GR1),FR8,4 | B(5)→PFR<4,8> |
| 7 | | FMLT FR10,FR8,FR7 | B(1) (PFR<0,8>)' S→PFR<0,10> |
| 8 | | FWSTPS 1,1 | FWSTP=1 |
| 9 | | FLDPRM 8(GR1),FR8,4 | B(6)→PFR<5,8> |
| 10 | | FMLT FR10,FR8,FR7 | B(2) (PFR<1,8>)' S→PFR<1,10> |
| 11 | | FWSTPS 1,1 | FWSTP=2 |
| 12 | | FLDPRM 8(GR1),FR8,4 | B(7)→PFR<6,8> |
| 13 | | FMLT FR10,FR8,FR7 | B(3) (PFR<2,8>)' S→PFR<2,10> |
| 14 | | FWSTPS 1,1 | FWSTP=3 |
| 15 | | FLDPRM 8(GR1),FR8,4 | B(8)→PFR<7,8> |
| 16 | | FMLT FR10,FR8,FR7 | B(4) (PFR<3,8>)' S→PFR<3,10> |
| 17 | | FWSTPS 1,1 | FWSTP=4 |
| 18 | LOOP | FLDPRM 8(GR1),FR8,4 | B(i+8)→PFR<i+7 (mod 30),8> |
| 19 | | FMLT FR10,FR8,FR7 | B(i+4) (PFR<i+3 (mod 30),8>)' S→PFR<i+3 (mod 30),10> |
| 20 | | FSTPOM 8(GR3),FR10,4 | PFR<i-1 (mod30),10>→A(i) |
| 21 | | FWSTPS 1,1 | FWSTP=FWSTP+1 (=i+4) |
| 22 | | BCNT GR4,LOOP | IF i<N-8 THEN RETURNS TO "LOOP" |
| 23 | | FMLT FR10,FR8,FR7 | B(N-3) (PFR<N-4 (mod 30),8>)' S→PFR<N-4 (mod 30),10> |
| 24 | | FSTPOM 8(GR3),FR10,4 | PFR<N-8 (mod30),10>→A(N-7) |
| 25 | | FWSTPS 1,1 | FWSTP=FWSTP+1 (=N-3) |

FIG. 9

| No. | RELATIVE ADDRESS | INSTRUCTION STRING | OPERATION |
|---|---|---|---|
| 26 | | FMLT FR10,FR8,FR7 | B(N-2) (PFR<N-3 (mod 30),8>)' S→PFR<N-3 (mod 30),10> |
| 27 | | FSTPOM 8(GR3),FR10,4 | PFR<N-7 (mod30),10>→A(N-6) |
| 28 | | FWSTPS 1,1 | FWSTP=FWSTP+1 (=N-2) |
| 29 | | FMLT FR10,FR8,FR7 | B(N-1) (PFR<N-2 (mod 30),8>)' S→PFR<N-2 (mod 30),10> |
| 30 | | FSTPOM 8(GR3),FR10,4 | PFR<N-6 (mod30),10>→A(N-5) |
| 31 | | FWSTPS 1,1 | FWSTP=FWSTP+1 (=N-1) |
| 32 | | FMLT FR10,FR8,FR7 | B(N) (PFR<N (mod 30),8>)' S→PFR<N-1 (mod 30),10> |
| 33 | | FSTPOM 8(GR3),FR10,4 | PFR<N-5 (mod30),10>→A(N-4) |
| 34 | | FWSTPS 1,1 | FWSTP=FWSTP+1 (=N) |
| 35 | | FSTPOM 8(GR3),FR10,4 | PFR<N-4 (mod30),10>→A(N-3) |
| 36 | | FWSTPS 1,1 | FWSTP=FWSTP+1 (=N+1) |
| 37 | | FSTPOM 8(GR3),FR10,4 | PFR<N-3 (mod30),10>→A(N-2) |
| 38 | | FWSTPS 1,1 | FWSTP=FWSTP+1 (=N+2) |
| 39 | | FSTPOM 8(GR3),FR10,4 | PFR<N-2 (mod30),10>→A(N-1) |
| 40 | | FWSTPS 1,1 | FWSTP=FWSTP+1 (=N+3) |
| 41 | | FSTPOM 8(GR3),FR10,4 | PFR<N-1 (mod30),10>→A(N) |

DATA PROCESSING UNIT WHICH CAN ACCESS MORE REGISTERS THAN THE REGISTERS INDICATED BY THE REGISTER FIELDS IN AN INSTRUCTION

This application is a continuation of application Ser. No. 08/162,252, filed on Dec. 7, 1993.

BACKGROUND OF THE INVENTION

This invention relates to a data processing unit. More particularly, it relates to a technology which enables a data processing unit to make access to a greater number of registers than the number of registers which can be accessed by instructions. Further particularly, the present invention relates to a technology which hardly induces the drop of performance due to data transfer from a main memory during a so-called "vector processing" for continuously processing data of a large scale, for which a cache is not much effective, and which can accomplish an pseudo-vector processing by an ordinary data processing unit.

JP-A-57-166649 describes technologies of enabling a data processing unit to make access to a greater number of registers than the number of registers accessible by instructions. According to this reference, a greater number of registers referred to as "hardware registers" than the number of general purpose registers accessible by instructions are first disposed, and when a plurality of load instructions are issued to the same general purpose registers from different main memory addresses, they are stored in the same number of hardware registers as the number of the load instructions. When the number of general purpose registers accessible by a program is 16, for example, sixteen hardware registers for each general purpose register, or in other words, 256 in total, of the hardware registers, are prepared, and the hardware registers Nos. 0 to 15, for example, are allotted to the general purpose register No. 0. When a load instruction designating 16 different main memory addresses for the general register No. 0 is executed, the data from the 16 load instructions are stored in the hardware registers Nos. 0 to 15. There is also disposed a memory mechanism for registering the main memory addresses of the load instructions that have been executed in the past, and the hardware register number storing the data loaded at that time. When the load instruction issued by the program coincides with the main memory address registered to this memory mechanism, the data is not read out from the main memory but from the corresponding hardware register. According to this system, the number of times lookup to the main memory is performed can be reduced and the drop of performance due to collision of the lookup registers between the instructions can be prevented.

Another known technology enables a data processing unit to access a greater number of registers than the number of registers accessible by instructions. Such a technology is described in Hennesy & D. A. Patterson, "Computer Architecture: A Quantitative Approach", pages 450–454, Morgan Kaufmann Publishers, Inc. (1990). According to this reference, a greater number of registers called "physical registers" than the number of registers accessible by programs are first disposed, and the physical registers are divided into a plurality of segments referred to as "windows". In other words, each window comprises a plurality of physical registers. The reference assumes that the registers are numbered from Nos. 1 to n by the program and the physical registers are numbered by n*m ("*" means multiplication), that is, from No. 1 to No. n*m. When m windows, that is, from Nos. 1 to m, are disposed, the window No. 1 can be allotted t the physical registers Nos. 1 to n, and the window No. 2, to the physical registers Nos. n+1 to 2n, for example. Though physical registers common to all the windows, physical registers common to adjacent windows, etc, are disposed in practice, this example is given for the purpose of simplification. Each window has the registers used by one program. In other words, to look up the register accessible by a certain program is to look up the physical register belong to a certain window, in practice. For instance, if the window 2 is allotted to a certain program in the example given above, when the register k is designated by this program, the physical register which is to be looked up is the physical register n+k.

This window is used in the following way. Assuming that the window j is allotted to a certain program and when this program calls another program, the window j+1 is allotted to this called program. Assuming that the window j is allotted to a certain program and when the program returns to a program calling it, the window j−1 is allotted to the program of the return end. The use of the window in this way provides the following effects. Namely, in a system having only the same number of registers as the number of registers accessible by the programs, the data stored in the registers must be stored in the main memory whenever call of the program such as described above occurs, so as to preserve the data at the time of occurrence of the call, and the data stored in the main memory must be rewritten to the registers, whenever the return of the program occurs, so as to re-start the program. In the system having the window mechanism described above, on the other hand, the program to which a different window is allotted looks up a different physical register. For this reason, storage from the register into the main memory and re-write from the main memory to the register become unnecessary, and processing can be sped up as much.

In the system having such a window mechanism, however, control must be made so that "when call of a program is generated from a program having the greatest window number, interrupt of window overflow be made and when return of a program is generated from the program having the smallest window number, interrupt of window underflow be made".

The major part of the scientific and technological calculation are vector calculations given below:

$$A(i)=B(i)*S \quad i=1,N \tag{1}$$

where A and B are vectors of an element number N and S is a scalar.

In the following description, the data width of the floating point registers is 8 bytes.

When the equation (1) is computed by a general purpose computer, a program such as shown in FIG. 6 can be obtained.

The function of each of the instructions shown in FIG. 6 will be explained below.

FLDM a(GRm), FRn (Function)
    8-byte data is read out from a main memory address indicated by the value of a general register m and is stored in a floating point register n. Thereafter, the value of the general m is added with a.

FMLT FRj, FRm, FRn (Function)
    The product of the value of the floating point resister m and the value of the floating point resister n is stored in the floating point register j.

FSTM a(GRm), FRn (Function)

The value (8-byte) of the floating point register n is stored in a main memory address indicated by the value of the general register m.

Thereafter, the value of the general register m is added with a.

BCNT GRm, t (Function)

The value of GRm is subtracted by 1. If the result is not zero, the program branches to the address t. If it is zero, the program does not branch.

It will be assumed hereby that the vector B is stored in a continuous region starting from the main memory address adl before the execution of the program shown in FIG. 6. In other words, the main memory address of B(1) and the main memory address of B(2) are stored at adl and adl+8, respectively. It will also be assumed that the vector A is stored similarly in a continuous region starting from the main memory address ad3. Further, adl, ad3 and N are assumed to be stored in advance in the general register 1, the general register 3 and the general register 4, respectively. S is assumed to be stored in advance in the floating point resister 7.

As can be understood from FIG. 6, B(i) is loaded to the floating point register 8 by the FLDM instruction No. 1, the product of the value of this floating point register and the value of the floating point register 7 is stored in the floating point register 10 by the FMLT instruction No. 2, and the value of this floating point register is stored in A(i) by the FSTM instruction No. 3.

In other words, when a loop comprising the four instructions is executed once, the result of one element can be determined, and all the elements can be calculated by executing N times this loop.

Here, the execution time of one loop becomes a problem. First, the data is loaded from the main memory to the floating point register by the FLDM instruction No. 1, and the FLDM instruction can be terminated with a small number of cycles when any data exists in the cache. However, when no data exists in the cache, the data must be read out from the main memory having a considerably lower speed than the cache, and a longer time is necessary than when any data exists in the cache. Next, the FMLT instruction No. 2 uses the value of the floating point register 8. Therefore, unless load described above is completed, the execution cannot be started. The FSTM instruction No. 3 uses the value of the floating point register 10, but since the value of the floating point register 10 is not determined before the execution of the preceding FMLT instruction is completed. Accordingly, the execution cannot be started, either.

In other words, two factors for reducing performance, i.e. (1) the data read time and (2) collision of the registers, prolong the execution time of the loop. Particularly (1) the data read time is a critical problem in the case of computation handling enormous data, and necessary data cannot be fully stored in the cache and the drop of performance becomes greater.

One of the means for solving this problem is loop unrolling and is shown in FIG. 7. This is a system which reduces a number of times of looping to 1/n in comparison with the case where a plurality of elements (=n) are processed by one loop and one element is processed by one loop. FIG. 7 shows a system which processes four elements by one loop.

It will be assumed that the vector B is stored in advance in a continuous region starting from the main memory address before the execution of the program shown in FIG. 7. In other words, the main memory address of B(1) is stored in adl and the main memory address of B(2) is stored in adl+8. Similarly, the vector A is assumed to be stored in a continuous region starting from the main memory address ad3. It will also be assumed that adl, ad3 and N/4 are stored in advance in the general register 1, the general register 3 and the general register 4, respectively. It will be assumed that S is stored in advance in the floating point register 7.

As can be understood from FIG. 7, when a loop comprising 13 instructions is once executed, the result of our elements can be determined, and when this loop is executed N/4 times, all the elements can be calculated.

As can also be understood from FIG. 7, load is effected by the FLDM instruction No. 1, multiplication by the FMLT instruction No. 5 and store, by the FSTM instruction No. 9, for the ith element. Similarly, load is effected by the FLDM instruction No. 2, multiplication, by the FMLT instruction No. 6 and store, by the FSTM instruction No. 10, for the (i+1)th element. Similarly, load is effected by the FLDM instruction No. 3, multiplication, by the FMLT instruction No. 7, and store, by the FSTM instruction No. 11, for the (i+2)th element. Similarly, load is effected by the FLDM instruction No. 4, multiplication, by the FMLT instruction No. 8 and store, by the FSTM instruction No. 12, for the (i+3)th element. In comparison with FIG. 6, therefore, a series of processing such as load, multiplication and store are separated from one another on an instruction string for the element indicated by a certain element number, and the two major factors for inviting the drop of performance, that is, (1) the data read time and (2) collision of the registers, can be reduced. For example, load of B(i) is effected by the FLDM instruction No. 1, but it is only after four instructions that the load result is employed. Accordingly, if the data read time is within the four cycles, the FMLT instruction No. 5 using this load result is not brought into the waiting state. Further, it is only after four instructions that the result of multiplication B(i)*S by the FMLT instruction No. 5 is used. Accordingly, if the time necessary for multiplication is within four cycles, the FSTM instruction No. 9 is not brought into the waiting state.

Though loop unrolling can improve system performance, it is not free from the drawback that a large number of registers are necessary. Whereas the program shown in FIG. 6 needs three floating point registers, the program shown in FIG. 7 needs nine floating point registers. If the data read time is much more longer or if the calculation time is longer, a greater number of elements must be processed in one loop, so that a greater number of registers become necessary.

Generally, a register comprises an active device (that is, a device which is not a memory device) and can provide a large number of read/write ports (that is, data input/output ports). Therefore, the register has an operation speed which is by far higher than that of a so-called "memory device" which can read/write only one data in one operation cycle. Therefore, a system must essentially include registers having a sufficient capacity in comparison with not only the main memory but also with the cache so as to improve the operation speed. Nonetheless, the reason why the number of registers is relatively small in the conventional systems is because the cost per bit is high and the length of a field of a register number on the instruction format is limited as illustrated below. Although the problem of cost has now been soled to some extents by LSIs, the latter problem is left yet to be solved.

The number of the registers which can be accessed by a program is limited from the aspect of an architecture. For example, if five bits of register designation field exist in an instruction word, the number of registers which can be addressed is 32 ($2^5$). The number of the registers accessible by the program can be increased by increasing the number of bits of the register designation field, but this is unrealistic because the instruction format changes and hence, the existing program must be changed.

Therefore, a system has become necessary which enables a data processing unit to make access to a greater number of registers than the number of registers accessible by an instruction, without changing the architecture of the data processing unit. According to the first prior art technology described already, the operation speed can be improved when a load instruction is executed afresh for the main memory address for which the load instruction has been executed in the past. However, in most of the vector calculations expressed by the equation (1), a load request for the data on the main memory is issued only once as in the program shown in FIG. 6. In other words, the prior art technology cannot improve the operation speed in this case.

According to the prior art technology 2 described already, it is only the physical registers belonging to a certain window that can be used by one program, and the number of such registers is equal to the number of registers that can be accessed by the program. Therefore, an operation executed by one program cannot be sped up. In other words, the aforementioned window function can improve the processing speed only when call and return of the program occur, but cannot improve the processing speed when processing is completed by one program such as the vector calculation of the equation (1). Another problem is that the interrupt of window overflow and window underflow is not necessary when processing is completed by one program and call and return of the program do not occur, such as in the vector calculation of the equation (1).

SUMMARY OF THE INVENTION

It is an object of the present invention to provide a system which enables a data processing unit to make access to a greater number. Of registers than the number of registers addressable by an instruction without changing the architecture of the data processing unit, and executes at a high speed the vector calculation in scientific and technological calculation.

It is another object of the present invention to prevent the drop of performance due to influences of a data read time and an operation execution time by increasing the distance of load, operation and store processings on an instruction string for one data in loop calculation for repeatedly processing the instruction string.

It is still another object of the present invention to render a data processing unit flexible enough to cope with the change of the data read time and the operation execution time in the loop processing, and to cope with loop calculation of a programming having various characteristics.

It is still another object of the present invention to make it possible to control the number of registers addressable by an instruction in common to each loop in loop processing by a data processing unit, and to accomplish flexible programming.

To accomplish the objects described above, the present invention disposes a greater number of floating point registers than the number of floating point registers accessible by a floating point register field of an instruction, which are referred to as "physical floating point registers" and are looked up by a physical floating point register number; window start pointer registers for storing the number referred to as a "window start pointer"; registers which are referred to as "window start pointer valid registers" for representing that the window start pointer is valid; a conversion circuit for converting a value, which is referred to as a "logical floating point register number" and is indicated in the floating point register field in the instruction, to the physical floating point register value by the value of the window start pointer or by the value of a window stride indicated in the window start pointer and in a specific instruction, when the window start pointer valid register is 1; a floating point register pre-load instruction having a floating point register field and a window stride field in an instruction for storing a main memory data in a physical floating point register obtained by converting a logical floating point register number by a value obtained from the window start pointer and the window stride; a floating point register post-store instruction having a floating point register field and a window stride field in an instruction, for storing data into the main memory from a physical floating point register obtained by converting the logical floating point register number by a value obtained from the window start pointer and the window stride; and a window start pointer set instruction for setting a value to the window start pointer register.

All the instructions which look up the floating point registers, other than the floating point register pre-load instruction and the floating point register post-store instruction, do not have the window stride field in the instruction. Therefore, when the value of the window start pointer valid register is 1, conversion is made from the logical floating point register number to the physical floating point register number by regarding the value of the window stride as 0, and the physical floating point register number is looked up by reference of the floating point register. If the value of the window start pointer valid register is 0, the logical floating point register number is equal to the physical floating point register number.

When the value of the window start pointer valid register is 1 in the floating point register preload instruction and the floating point register post-store instruction, conversion of the logical floating point register number to the physical floating point register number is effected as described above, and the physical floating point register is looked up. When the value of the window start pointer valid register is 0, the logical floating point register number is equal to the physical floating point register which is looked up.

Conversion of the logical floating point register number to the physical floating point register number is effected in the following way. A plurality of ranges of the physical floating point register number are disposed for the logical floating point register number to select, and designation of this range by the logical floating point register number is referred to as a "window". The window number will be hereby called "w". Also, a number called a "register number slide quantity" is hereby introduced, and will be hereinafter expressed by "p".

An example of disposition of the window is shown in FIGS. 1 and 2. In this example, the number of logical floating point registers is 32, and can be designated from 0 to 31. The number of physical floating point registers is 128, and can be selected from 0 to 127. Hereinafter, the number of physical floating point registers will be expressed by mr, and when mr is any power of 2, the value of an index will be expressed by "sm" (that is, mr=2sm). Here, the symbol "" represents the power. When mr is not the power of 2, an integer smaller than $\log_2$ (logarithm having 2 as the base) mr and is most approximate thereto is used as sm.

Hereinafter, sm will be called a "pointer width maximum value".

In other words, in this example, mr=128 and sm=7. Among the physical floating point registers, those registers which are always converted to the same register number during the conversion of the logical floating point register number to the physical floating point register number and are used in common by all the windows will be referred to as "global registers", and the number of such global registers will be expressed by "mg". In this example, mg=8. Further, the bit number of the window start pointer register will be called a "window start pointer register width" and will be expressed by "q" (where q is a positive integer smaller than sm).

When the value of the window start pointer is FWSTP and the value of the window stride in the instruction is wstr, the window number w is expressed as follows:

In the floating point register pre-load instruction:

$$w = FWSTP + wstr,$$

$$mod(mr-mg)/(2^{**}(sm-q)) \quad (2)$$

In the floating point register post-store instruction:

$$w = FWSTP - wstr,$$

$$mod(mr-mg)/(2^{**}(sm-q)) \quad (3)$$

In instructions other than two instructions described above:

$$w = FWSTP,$$

$$mod(mr-mg)/(2^{**}(sm-q)) \quad (4)$$

In the equations (2) to (4), mr−mg is the difference obtained by subtracting the number of the global registers from the number of the physical floating point registers, and is referred to as the "number of local registers". It is the number of the physical floating point registers to which the program using each window makes access. In the equations (2) to (4), $2^{}(sm-q)$ represents by which distance the adjacent windows are spaced apart from each other on the physical floating point register number, and is referred to as the "window cut width". In the equations (2) to (4), (mr−mg)/($2^{}(sm-q)$) is the quotient obtained by dividing the number of the local registers by the window cut width, represents the total number of the windows, and is referred to as the "number of windows".

The register number slide quantity p is expressed in the following way.

$$p = 2^{**}(sm-q)*w \quad (5)$$

In other words, it is the product of the window cut width by the window number, and represents by which distance the leading part of the local register of each window (that is, the registers other than the global registers) is spaced apart from the leading part of the local register of the window 0, on the physical floating point register number.

FIGS. 1 and 2 show the case where sm=7 and q=5, by way of example. Thirty windows of w0 to w29 are shown disposed. In other words, the number of windows is 30.

Here, calculation of w is made using the number of windows as a modulus. Therefore, in the case of w=29, for example, the value w+1 is 0.

Here, when the logical floating point register number is expressed as r, the physical floating point register number is determined by w and r and is hence expressed as <w, r>.

In the examples shown in FIGS. 1 and 2, conversion of the logical floating point register number to the physical floating point register number is effected in the following way.

1. When 0≦r≦7:

$$<w, r> = r \quad (6)$$

irrespective of w (that is, irrespective of p)

2. When 8≦r≦31:

$$<w, r> = p + r \quad (7)$$

In the conversion method expressed by the equations (2) to (7), the following three points are characterizing features.

1. The 0th to 7th logical floating point registers are used in common for each window. These registers hold data which is in common to arithmetic loops using the respective windows, as the global registers.

2. The logical floating point register of each window and the logical floating point register of a window having a greater window number by one sometimes represent the same physical floating point register.

These registers are used to exchange data between the arithmetic operation loops using the adjacent windows as overlap registers.

3. The window cut width can be changed by changing the pointer width maximum value sm or the window start pointer register width q.

When sm=7, the register cut is 2 at q=6 and 8 when q=4.

The following explanation will be given on the case where sm and q are fixed to sm=7 and q=5.

Here, a method which does not dispose the global registers can be conceived. In this case, the value mr−mg in the equations (2) to (4) is replaced by mr and the equations (6) and (7) are given as follows irrespective of r:

$$<w, r> = p + r \quad (8)$$

The instruction mnemonics and functions of the instruction newly provided are determined as follows, by way of example.

1. Window start pointer set instruction:

(Instruction mnemonic) FWSTPS u, v (Function)

When u=0, v is set to the window start pointer register. When u=1, v is added to the value of the window start pointer register. Here, addition is made using (mr−mg)/($2^{**}(sm-q)$) as a modulus.

2. Floating point register pre-load instruction:

(Instruction mnemonic) FLDPRM a(GRm), FRn, wstr (Function)

8-byte data is read out from the main memory address indicated by the value of the general register m and is stored in the floating point register n. At this time, conversion of the logical floating point register number to the logical floating point register number using the value p obtained by the equations (2) and (5).

Thereafter, the value of the general register m is added with a.

3. Floating point register post-store instruction:

(Instruction mnemonic) FSTPOM a(GRm), FRn, wstr (Function)

The value of the floating point register n (8 bytes) is stored in the main memory address indicated by the value of the general register m. At this time, conversion of the logical floating point register number to the physical floating point register number is effected using the value p obtained by the equations (3) and (5). Thereafter, the value of the general register m is added with a.

In the floating point instructions in general (that is, the instructions using the floating point register, other than the instructions 2 and 3 described above), conversion of the logical floating point register number to the physical floating point register number is effected using the value p obtained by the equations (4) and (5).

The present invention is particularly effective for a coding method referred to as "modulo scheduling". This modulo scheduling is described in the following references:

B. R. Rau et al, "Register Allocation for Software Pipelined Loops": ACM SIGPLAN, 1992, Pages 283–299, and Tirumalai et al, "Parallelization Of Loops With Exists On Piplined Architectures": Supercomputing, 1990, Pages 200–212.

Hereinafter, the computer as the object of the present invention will be assumed to be a superscalar processor capable of executing in parallel a load instruction, an arithmetic instruction and a store instruction. In other words, a unit for executing the load instruction, a unit for executing the arithmetic instruction and a unit for executing the store instruction are separated from one another, and they can be simultaneously activated. FIG. 3 shows the result obtained by coding the equation (1) by modulo scheduling. In FIG. 3, LOAD B(i) is an instruction for loading B(i) from the main memory to the floating point register, and the floating point register number is omitted. B(i)*S represents an instruction for multiplying B(i) loaded by LOAD B(i) from the main memory to the floating point register by S stored in another floating point register, and storing the product into still another floating point register, and the floating point register number is omitted. STORE A(i) represents an instruction for storing the calculation result stored by B(i)*S into the floating point register to the position of A(i) of the main memory, and the floating point register number is also omitted. In FIG. 3, the term "cycle" represents the time in a machine cycle unit, and the instructions written in the same cycle are simultaneously started for execution. In other words, only LOAD B(i) is executed in the cycle 1, LOAD B(5) and MULT B(1)*S are simultaneously executed in the cycle 5, and LOAD B(9), MULT B(5)*S and STORE A(1) are simultaneously executed in the cycle 9. In the instruction string of the practical program, a plurality of instructions the execution of which is simultaneously started are sequentially written. For example, LOAD B(5) and MULT B(1)*S the execution of which is started simultaneously in the cycle 5 are written in this order on the practical program. A hardware judges that the start of the simultaneous execution of these two continuous instructions LOAD B(5) and MULT B(1)*S is possible, and activates the respective execution units. Hereinafter, meaning in FIG. 3 will be explained.

It will be assumed that to execute the equation (1), processing of each element is executed by one iteration, and that one iteration comprises stage 1: load of B, stage 2: multiplication, and stage 3: store to A. It will also be assumed that each stage needs four cycles. In other words, each of read of the memory, multiplication and write into the memory needs four cycles. Then, four cycles are necessary from the start of the stage 1 for the ith element and four cycles are necessary from the start of the stage 2 to the start of the stage 3. Therefore, multiplication is started after four cycles from load of the ith element, and further four cycles later, store is started. Load of the (i +1)th element after one cycle from load of the ith element, multiplication of the (i +1)th element is started after one cycle from multiplication of the ith element, and store of the (i +1)th element is started after one cycle from store of the ith element. When the instructions are scheduled in this way, there occurs the portion at which the stage 1 relating to the (i +8)th element, the stage 2 relating to the (i +4)th element and the stage 3 relating to the ith element can be executed simultaneously, as shown in FIG. 3. This portion will be referred to as a "kernel". The term "simultaneous execution" hereby means that the stage 1 relating to the (i +8)th element, the stage 2 relating to the (i +4)th element and the stage 3 relating to the ith element simultaneously proceed at the same timing. This is because the computer to which the present invention is directed is the superscalar processor capable of executing in parallel the load instruction, the arithmetic instruction and the store instruction. In other words, since the three stages simultaneously operate at the kernel portion, the operation speed is high. In the program such as one shown in FIG. 3, the portions ahead and behind the kernel portion will be referred to as "prologue" and "epilogue", respectively. In the instruction string of the practical program, a plurality of instructions the execution of which is simultaneously started are written in sequence.

When the equation (1) is scheduled using the functions newly disposed in accordance with modulo scheduling, the program such as shown in FIGS. 8 and 9 can be obtained.

It will be assumed hereby that the computer for executing the program shown in FIGS. 8 and 9 is a superscalar processor capable of executing in parallel the load instruction, the arithmetic instruction and the store instruction, as already described.

It will be assumed that a vector B is stored in a continuous region starting from a main memory address adl before the execution of the program shown in FIGS. 8 and 9. In other words, the main memory address of B(1) is adl and the main memory address of B(2) is adl+8. Similarly, it will be assumed that a vector A is stored in a continuous region starting from the main memory address ad3. It will also be assumed that adl is stored in the general register 1, ad3, in the general register 3, N–8, in the general register 4, 1, in the window start pointer valid register, and S, in the physical floating point register 7.

Hereinafter, FIGS. 8 and 9 will be explained. In the FWSTPS instruction of No. 1, 0 is set to the window start pointer. In the FLDPRM instruction of No. 2, B(1) is stored in the physical floating point register <0, 8> because w=FWSTP+wstr=0+0=0. In the FLDPRM instruction of No. 3, B(2) is stored in the physical floating point register <1, 8> because w=FWSTP+wstr=0+1=1. In the FLDPRM instruction of No. 4, B(3) is stored in the physical floating point register <2, 8> because w=FWSTP+wstr=0+2=2. In the FLDPRM instruction of No. 5, B(4) is stored in the physical floating point register <3, 8> because w=FWSTP+wstr=0+3=3. In the FLDRPM instruction of No. 6, B(5) is stored in the physical floating register <4, 8> because w=FWSTP+wstr=0+4=4. In the FMLT instruction of No. 7, the logical floating point register 7 is designated, and this register is the physical floating point register 7 from the equation (6) (that is, the global register). Accordingly, the value (=S) of the physical floating point register 7 is read out, and since w=FWSTP=0, the product is calculated with the physical floating point register <0, 8> (=B(1)) and is stored in the physical floating point register <0, 10>. In the FWSTPS instruction of No. 8, 1 is added to the window start pointer. In other words, FWSTP=1. In the FLDPRM instruction of No. 9, B(6) is stored in the physical floating point register <5, 8> because w=FWSTP+wstr=1+4=5. In the FMLT instruction of No. 10, the product is calculated between the physical floating point register <1, 8> (=B(2)) and S and is stored in the physical floating point register <1, 10> because w=FWSTP=1. In the FWSTPS instruction of No. 11, 1 is added to the window start pointer. In other words, FWSTP= 2. In the FLDPRM instruction of No. 12, B(7) is stored in the physical floating point register <6, 8> because w=FW-STP+wstr=2+4=6. In the FMLT instruction of No. 13, the product is calculated between the physical floating point register <2, 8> (=B(3)) and S and is stored in the physical floating point register <2, 10> because w=FWSTP=2. In the FWSTPS instruction of No. 14, 1 is added to the window start pointer. In other words, FWSTP=3. In the FLDPRM instruction of No. 15, B(8) is stored in the physical floating point register <7, 8> because w=FWSTP+wstr=3+4=7. In the FMLT instruction of No. 16, the product is calculated between the physical floating point register <3, 8> (=B(4)) and S and is stored in the physical floating point register <3, 10>because W=FWSTP=3. In the FWSTPS instruction of No. 17, 1 is added to the window start pointer. In other words, FWSTP=4. The instruction string of Nos. 1 to 17 forms the prologue of FIG. 3.

The instructions from the FLRPRM instruction of No. 18 to the BCNT instruction of No. 22 constitute a loop and are repeatedly executed N–8times. Hereinafter, the loop executed at the first time will be examined (i starts from 1). FWSTP represent i+3. Since B(i+8) in the FLDPRM instruction of No. 18 is w=FWSTP+wstr=(i+3)+4=i+7, it is loaded to the physical floating point register <i+7 (mod 30), 8>. Since w=FWSTP=i+3 in the FMLT instruction of No. 19, it is stored in the physical floating point register <i+3 (mod 30), 10> by calculating the product between the physical floating point register <i+3 (mod 30), 8>(=B(i+4) and S. In the FSTPOM instruction of No. 20, since w=FWSTP−wstr= (i+3)−4=i−1, the value of the physical floating point register <i−1 (mod 30), 10> is stored in the main memory position of A(i). In the FWSTPS instruction of No. 17, 1 is added to the window start pointer. In other words, FWSTP=i+4. In the BCNT instruction of No. 22, the flow returns to the start of the loop. In other words, FWSTP=i+4. In the BCNT instruction of No. 22, the flow returns to the start of the loop. In other words, in the first loop, the data B(i+8) calculated in the fourth later loop is stored in the physical floating point register <i+7 (mod 30), 8>, multiplication is made using B(i+4) stored in the physical floating point register <i+3 (mod 30), 8> in the fourth preceding loop, and the result is stored in the physical floating point register <i+3 (mod 30), 10>, while B(i)*S which is the multiplication result obtained in the fourth preceding loop and is stored in the physical floating point register <i−1 (mod 30), 10> is stored in the main memory position of A(i).

As described above, the instructions ranging from the FLDPRM instruction of No. 18 to the BCNT instruction of No. 22 form the kernel shown in FIG. 3.

The instructions Nos. 23 to 41 exiting from the loop are processing of unprocessed elements. In the FMLT instruction of No. 23, since w=FWSTP=N−4, the product is calculated between the physical floating point register <N−4 (mod 30), 8> (=B(N−3)) and S, and the result is stored in the physical floating point register <N−4 (mod 30), 10>. In the FSTPOM instruction of No.2 4, since w=FWSTP−wstr=(N− 4)−4=N−8, the value of the physical floating point register <N−8 (mod 30), 10> is stored in the main memory position of A(N−7). In the FWSTPS instruction of No. 25, 1 is added to the window start pointer. In other words, FWSTP=N−3. In the FMLT instruction of No. 26, since w=FWSTP=N−3, the product is calculated between the physical floating point register <N−3 (mod 30), 8> (=B(N−2)) and S, and the result is stored in the physical floating point register <N−3 (mod 30), 10>. In the FSTPOM instruction of No. 27, since w=FWSTP−wstr=(N−3)−4=N−7, the value of the physical floating point register <N−7 (mod 30), 10> is stored in the main memory position of A(N−6). In the FWSTPS instruction of No. 28, 1 is added to the window start pointer. In other words, FWSTP=N−2. In the FMLT instruction of No. 29, since w=FWSTP=N−2, the product is calculated between the physical floating register <N−2 (mod 30), 8> (=B(n−1)) and S, and the result is stored in the physical floating point register <N−2 (mod 30), 10>. In the FSTPOM instruction of No. 30, since w=FWSTP−wstr=(N−2)−4=N−6, the value of the physical floating point register <N−6 (mod 30), 10> is stored in the main memory position of A(N−5). In the FWSTPS instruction of No. 31, 1 is added to the window start pointer. In other words, FWSTP=N−1. In the FMLT instruction of No. 32, since w=FWSTP=N−1, the product is calculated between the physical floating point register <N−1 (mod 30), 8> and S, and is stored in the physical floating point register <N−1 (mod 30), 10>. In the FSTPOM instruction of No. 33, since w=FWSTP−wstr=(N−1)−4=N−5, the value of the physical floating point register <N−5 (mod 30), 10> is stored in the main memory position of A(N−4). In the FWSTPS instruction of No. 34, 1 is added to the window start pointer. In other words, FWSTP=N. In the FSTPOM instruction of No. 35, since w=FWSTP−wstr= N−4=N−4, the value of the physical floating point register <N−4 (mod 30), 10> is stored in the main memory position of A(N−3). In the FWSTPS instruction of No. 36, 1 is added to the window start pointer. In other words, FWSTP=N+1. In the FSTPOM instruction of No. 37, since w=FWSTP−wrst=(N+1)−4=N−3, the value of the physical floating point register <N−3 (mod 30), 10> is stored in the main memory position of A(N−2). In the FWSTPS instruction of No. 38, 1 is added to the window start pointer. In other words, FWSTP=N+2. In the FSTPOM instruction of No. 39, since w=FWSTP−wstr=(N+2)−4=N−2, the value of the physical floating point register <N−2 (mod 30), 10> is stored in the main memory position of A(N−1). In the FWSTPS instruction of No. 40, 1 is added to the window start pointer. In other words, FWSTP=N+3. In the FSTPOM instruction of No. 41, since w=FWSTP−wstr=(N+3)−4=N−1, the value of the physical floating point register <N−1 (mod 30), 10> is stored in the main memory position of A(N). The instruction string of the instructions from No. 23 to No. 41 constitute the epilogue shown in FIG. 3.

As can be understood from the processing inside the ith loop, the data is written into the logical floating point register No. 8 in the FLDPRM instruction of No. 18, and the FMLT instruction of No. 19 immediately after the former uses the logical floating point register 8, but the physical floating point registers to which the access is made are <i+7 (mod 30), 8> and <i+3 (mod 30), 8> and are different. Accordingly, the phenomenon which occurs in the program shown in FIG. 6 and in which the execution of the subsequent instructions is caused to wait due to data readout does not occur. In other words, data readout may be completed at least before the execution of the FMLT instruction of the fourth subsequent loop, and the program can be executed at a higher speed. Here, the execution of the FLDPRM instruction of No. 18, the FMLT instruction of No. 19 and the FSTPOM instruction of No. 20 is simultaneously started. In other words, the execution of the FMLT instruction of the fourth subsequent loop is executed after the cycles of [(the execution start cycle (=1 cycle) of the FLDPRM instruction of No. 18, the FMLT instruction of No. 19 and the FSTPOM instruction of No. 20)+(the execution cycle of the FWSTPS instruction of No. 21)+(the execution cycle of the BCNT instruction of No. 22)]*4. Therefore, data readout requiring four cycles is completed after four loops, and the drop of performance due to data readout does not occur. In the FMLT instruction of No. 19, data is written into the logical floating point register No. 10 and in the FSTPOM instruction of No. 20 immediately after the former, the logical floating point register 10 is used. However, the physical floating point registers to which access is made are <i+3 (mod 30), 10> and <i-1 (mod 30), 10>, and are therefore different. Accordingly, the phenomenon which occurs in the program shown in FIG. 6 and in which the execution of the subsequent instructions is caused to wait till the end of the calculation does not occur. In other words, since multiplication needs be completed at least before the execution of four loops, the program can be executed at a higher speed. Here, the execution of the FLDPRM instruction of No. 18, the FMLT instruction of No. 19 and the FSTPOM instruction of No. 20 is simultaneously started. In other words, the execution of the FSTPOM instruction of the fourth subsequent loop is executed after the cycles of [(the execution start cycle (=1 cycle) of the FLDPRM instruction of No. 18, the FMLT instruction of No. 19 and the FSTPOM instruction of No. 20)+(the execution cycle of the FWSTPS instruction of No. 21)+(the execution cycle of the BCNT instruction of No. 22)]*4. Therefore, data readout requiring four cycles is completed before the end of four loops, and the drop of performance due to data readout does not occur.

It is only three physical floating point registers that are designated by the program, and nine floating point registers need not be used as they are required in the program shown in FIG. 7.

In the program shown in FIGS. 8 and 9, an updating processing of the window start pointer, which does not exist in the program shown in FIG. 6, exists and this becomes an overhead. For example, whereas the loop of the program shown in FIG. 6 comprises four instructions, the loop of the program shown in FIGS. 8 and 9 comprises five instructions. However, among the five instructions of the loop of the program shown in FIGS. 8 and 9, three instructions can be simultaneously executed and moreover, the overhead in the program of FIG. 6 in that the execution of the subsequent instructions is caused to wait due to data readout is by far greater. Further, the loop unrolling technique of the program shown in FIG. 7 cannot be accomplished when the registers which can be designated by the program are fully used. Therefore, the system of the present invention is believed superior, even though the overhead of updating the window start pointer is necessary.

Since the window numbers for loading/storing the data can be freely determined by window stride in the floating point register pre-load instruction and in the floating point register post-store instruction. Therefore, the present system can flexibly cope with any change of the data read time and the calculation time.

Furthermore, the window cut width and the register number slide quantity can be freely changed by changing the window pointer register width (generally, the pointer width maximum width is fixed), and for this reason, flexible programming can be made.

BRIEF DESCRIPTION OF THE DRAWINGS

FIG. 5A shows an example of a window start pointer set instruction according to the present invention;

FIG. 5B shows an example of a floating point register pre-load instruction according to the present invention;

FIG. 5C shows an example of a floating point register post-store instruction according to the present invention;

FIG. 6 shows an example of a program for a general purpose computer for effecting multiplication of a vector and a scalar as an example of vector calculation of scientific and technological calculation to which the present invention is directed;

FIG. 7 shows an example of rewriting, by loop unrolling, the program shown in FIG. 6 as an example of the program for general purpose computer for effecting multiplication of the vector and the scalar as an example of the vector calculation of the scientific and technological calculation as the object of the present invention;

FIG. 8 shows an example of rewriting of the program shown in FIG. 6 as the example of the program for the general purpose computer for effecting multiplication of the vector and the scalar as an example of the vector calculation of the scientific and technological calculation as the object of the present invention, by the use of instructions according to the present invention; and FIG. 9 shows an example of rewriting of the program shown in FIG. 6 as the example of the program for the general purpose computer for effecting multiplication of the vector and the scalar as an example of the vector calculation of the scientific and technological calculation as the object of the present invention, by the use of instructions according to the present invention.

DESCRIPTION OF THE PREFERRED EMBODIMENTS

Figure 1:
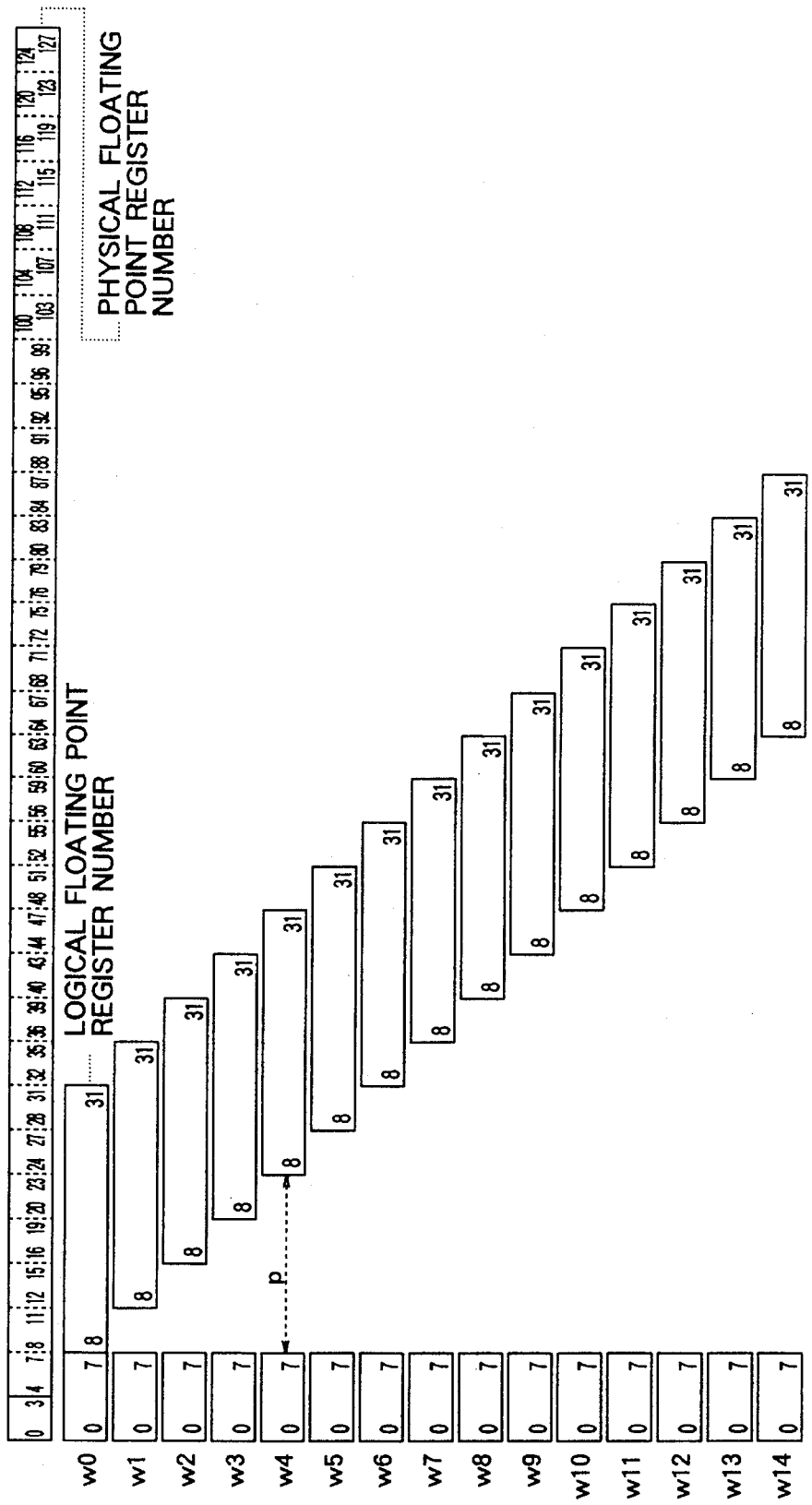
FIG. 1 shows an example of conversion of a logical floating point register number to a physical floating point register number according to the present invention.
Figure 2:
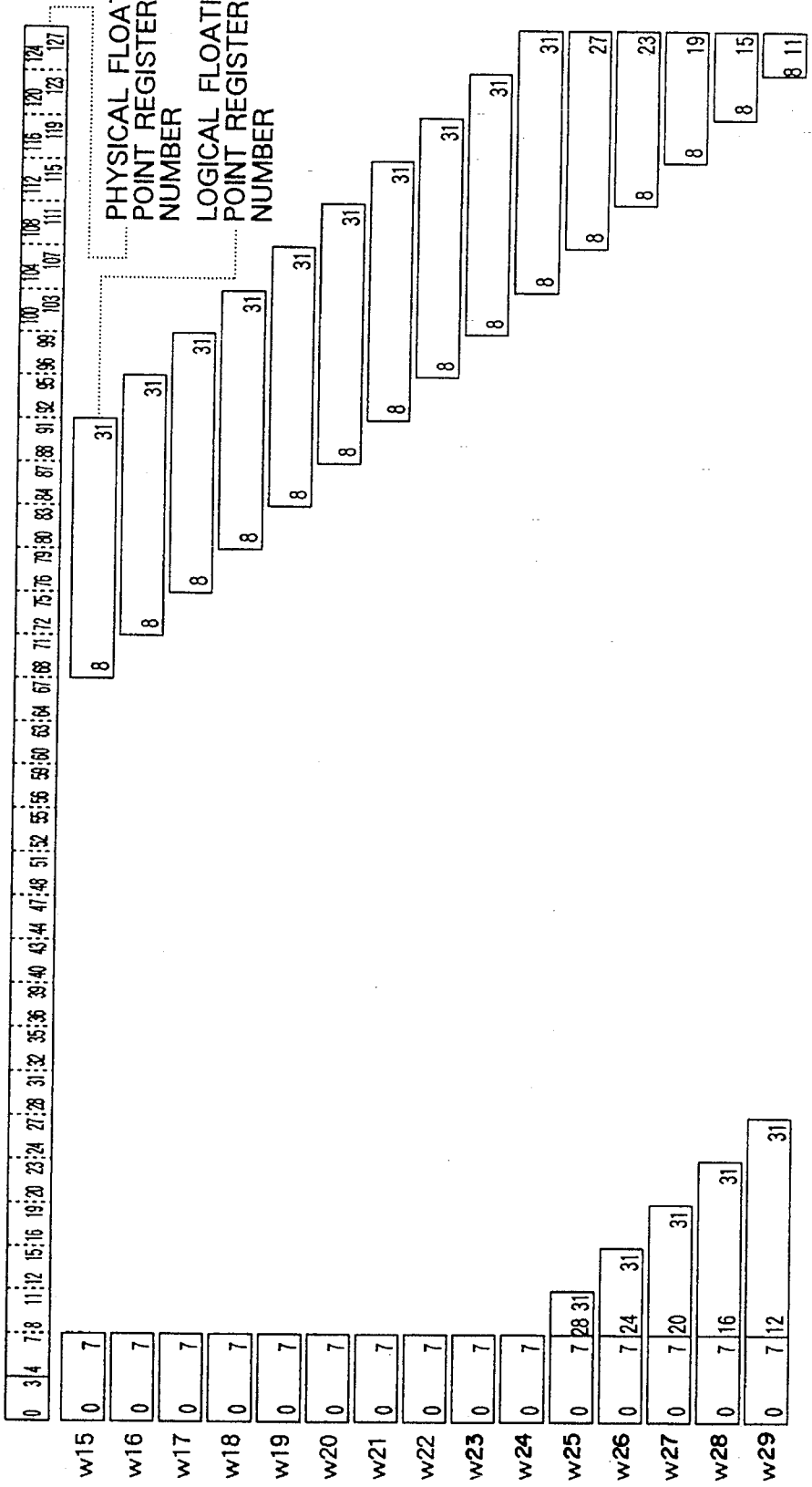
FIG. 2 shows an example of conversion of the logical floating point register number to the physical floating point register number according to the present invention.
Figure 3:
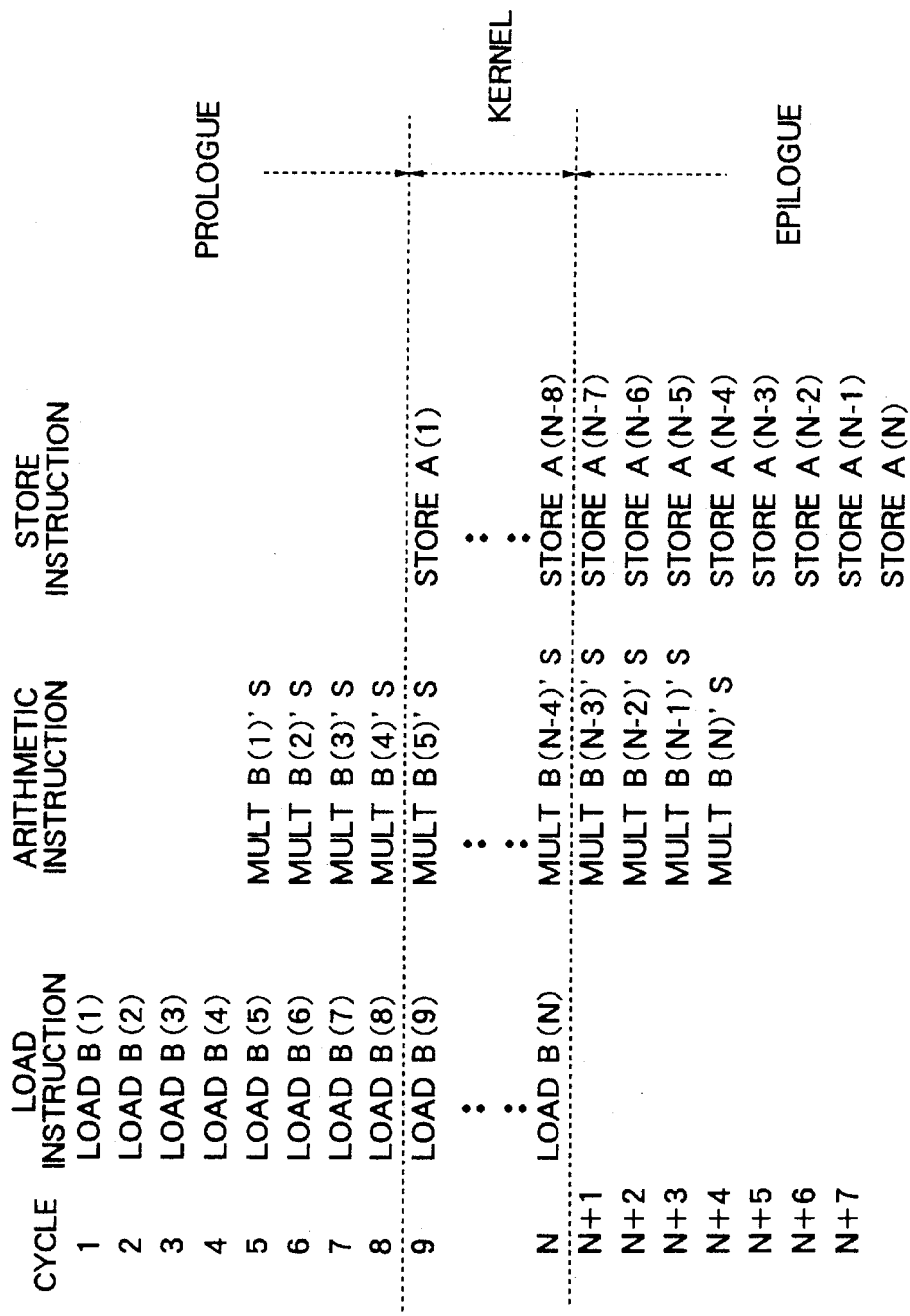
FIG. 3 shows the principle of modulo scheduling which is particularly effective in the present invention.
Figure 4:
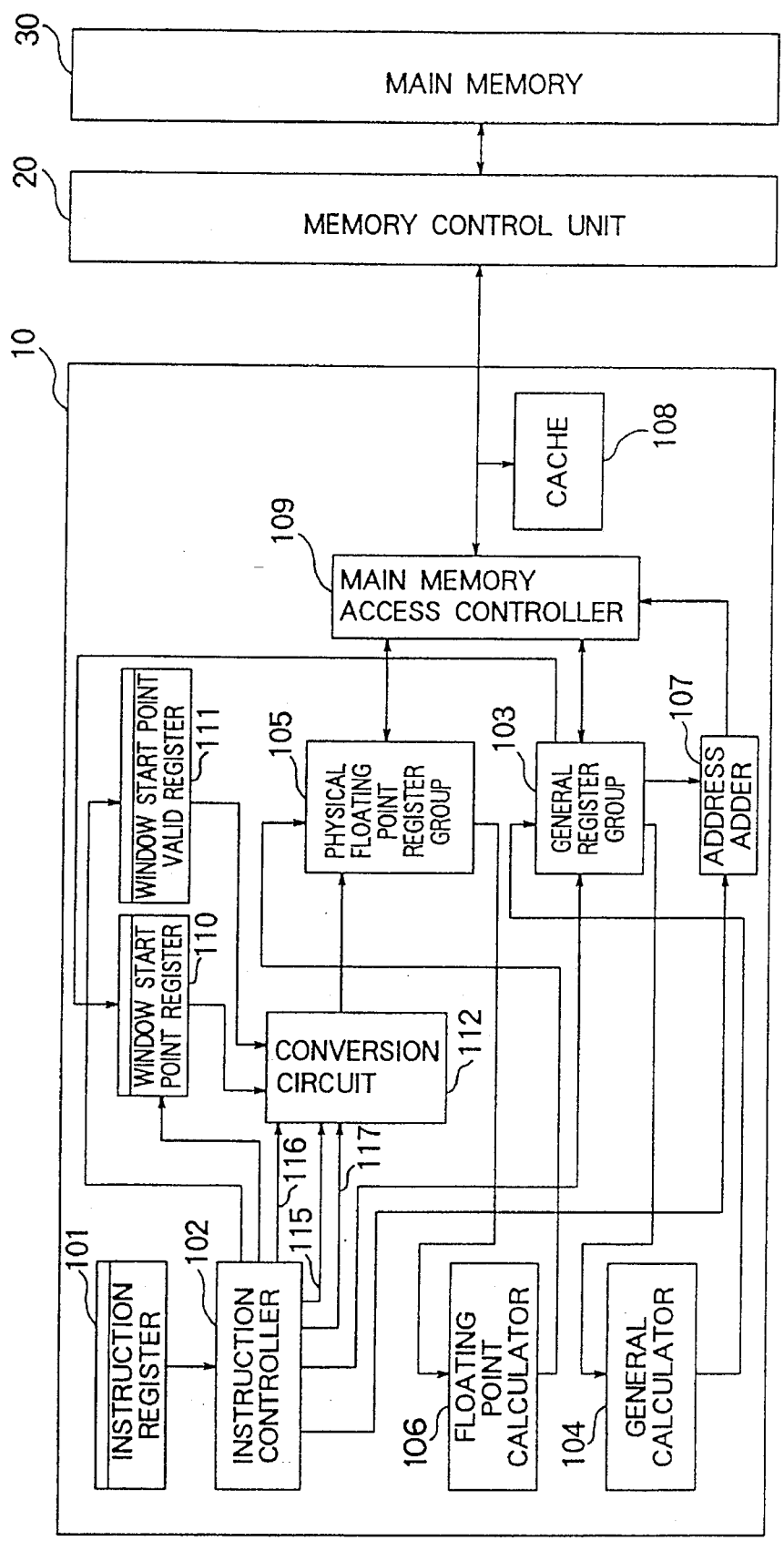
FIG. 4 is a structural view showing an example of a data processor for executing instructions shown in FIG. 5.

Hereinafter, an embodiment of the present invention will be described with reference to the drawings. FIG. 4 shows a data processor according to this embodiment. The data processor comprises an instruction processing unit 10 for issuing and executing instructions, a main memory 30 for storing the instructions and data to be executed by the instruction processing unit, and a memory control unit 20 for controlling data exchange between the instruction processing unit and the main memory.

The instruction processing unit 10 comprises an instruction register 101 for holding the instruction to be executed, an instruction controller 102 for decoding the content of the instruction register 101 and controlling execution of the instruction, a general register group 103 for holding data necessary for general arithmetic operations and address calculation, a general calculator 104 for executing general calculation indicated by the instruction, a physical floating point register group 105 for holding data necessary for floating point calculation, a floating point calculator 106 for executing floating point calculation designated by the instruction, an address adder 107 for calculating a main memory address for making access to the main memory data, a cache 108 for holding the main memory data read out from a memory control unit 20, a main memory access controller 109 for controlling readout of the main memory data from the memory control unit 20 in accordance with the result of retrieval by the cache 108, a window start point register 110 for storing a window start pointer, a window start pointer valid register 111 for representing that the window start pointer is valid, and a conversion circuit 112 for effecting conversion to physical floating point register numbers from a signal 115 representing the logical floating point register number designated by the instruction, a signal 116 representing the value of the window stride designated by the instruction, a signal 117 representing the value of a v field of a window start point set instruction, and the value of the window start pointer register 110 in accordance with the afore-mentioned equations (2) to (7). The conversion circuit 112 has the function of adding the value of the signal 117 to the value of the window start pointer register 110.

As already described in the "Operation", the instruction register 101 stores a plurality of instruction (three instructions in this case), and the instruction controller 102 can simultaneously decode a plurality of instructions (three instructions in this case). The main memory access controller 109 can simultaneously execute load and store. For this purpose, the address adder 107 can simultaneously execute address addition of the load instruction and the store instruction.

As shown in FIGS. 5A to 5C, three instructions are therefore added afresh to this data processor. FIG. 5A shows the window start pointer set instruction, FIG. 5B shows the floating point register pre-load instruction and FIG. 5C shows the floating point register post-store instruction.

In FIG. 5A, the instruction code represents that this instruction is the window start pointer set instruction. Symbol u designates which of the following instructions (i) and (ii) this instruction should execute. Symbol v designates the value which is set to the window start pointer register when (i) u=0, and the value which is added to the window start pointer register when (ii) u=1. Here, addition is made in accordance with (mr−mg)/(2**(sm−q)) as a modulus. In other words, since mr=128, mg=8, sm=7 and q=5 in the example described above, the addition result proves to be 0 when the value of the window start pointer FWSTP is 29 and v=1.

In FIG. 5B, the instruction code represents that this instruction is the floating point register pre-load instruction. The floating point register number is the logical floating point register number (which is hereby assumed to be r), and the corresponding physical floating point register number is <w, r> when the register number slide quantity p is defined by the equations (2) and (5) by assuming the window start pointer as FWSTP and the window stride as wstr. The value of the general register is the main memory address for reading out the data from the main memory. The value added to the general register after the execution of readout is an increment value. In FIG. 5C, the instruction code represents that this instruction is the floating point register post-store instruction. The floating point register number is the logical floating point register number (which is assumed as r) for the data to be read out, and the corresponding physical floating point register number is <w, r> when the register number slide quantity is defined by the equations (3) and (5) by assuming the window start pointer as FWSTP and the window stride designated in the instruction as wstr. The value of the general register is the address of the main memory storing the data. The value added to the general register after the execution of readout is the increment value.

These operations will be explained with reference to FIG. 4. First of all, the window start pointer set instruction will be explained. When the instruction is applied to the instruction register 101, it is decoded by the instruction controller 102. When it is determined to be the window start pointer change instruction, v designated in the instruction is set to the window start pointer register 110 when (i) u=0, and v designated in the instruction is sent to the conversion circuit 112 through the signal 117 and is added to the value of the window start pointer register 110 in the conversion circuit 112. The result of addition is set to the window start pointer register 110.

Next, the floating point register pre-load instruction will be explained. When an instruction is applied to the instruction resister 101, the instruction is decoded by the instruction controller 102, and when it is determined to be the floating point register preload instruction, the address adder 107 uses the content of the general register represented by the general register number designated to the instruction as the main memory address for reading out the data from the main memory. The main memory access controller 109 retrieves the cache 108 on the basis of the main memory address described above, transfers the data from the cache if the desired data exists in the cache, and transfers the data from the main memory 30 through the memory control unit 20 if it does not exist. The data thus transferred is stored in the floating point register 105, and the physical floating point register number of the floating point register thus stored is determined in the conversion circuit 112 in the following way. Assuming that the floating point register number designated in the instruction is the logical floating point register (which is assumed to be r), the value of the window start point register 110 is FWSTP and the value of the window stride designated in the instruction is wstr, the register number slide quantity p is calculated in accordance with the equations (2) and (5), and <w, r> is calculated as the physical floating point register number on the basis of the equations (6) and (7) using this value p. After the start of the data transfer operation, the general calculator 104 adds the increment value to the value of the general register.

Next, the floating point register post-store instruction will be explained. When an instruction is applied to the instruction register 101, the instruction is decoded by the instruction controller 102 and when it is discriminated as the floating point register post-store instruction, the address adder 107 uses the content of the general register represented by the general register number designated to the instruction as the main memory address for storing the data in the main memory. The data is read out from the floating point register 105, and the physical floating point register number of the register thus read out is determined by the conversion circuit 112 in the following way. Assuming that the floating point register number designated in the instruction is the logical floating point register number (which is assumed to be r), the value of the window start pointer register 110 is FWSTP and the value of the window stride designated in the instruction is wstr, the register number slide quantity p is calculated in accordance with the equations (3) and (5), and <w, r> is calculated as the physical floating point register number on the basis of the equations (6) and (7) using this value p. The main memory access controller 109 retrieves the cache 108 on the basis of the main memory address and if any copy of the data stored in the main memory address of the main memory 30 exists in the cache, this data is substituted by the read data described above and if not, the cache is not operated. Further, the main memory access controller 109 stores the read data in the main memory address of the main memory 30 through the memory control unit 20. After the start of this data transfer operation, the general calculator 104 adds the increment value to the value of the general register.

When the window start point valid register 111 is "1" in the ordinary floating point instructions (that is, the instructions using the floating point register other than the floating point register pre-load instruction and the floating point register post-store instruction described above), the logical floating point register number r is converted to the physical floating point register number expressed by <w, r> by the conversion circuit 11 by calculating the register number slide quantity p in accordance with the equations (4) and (5) by assuming the value of the window start pointer register 110 as FWSTP, and conducting calculation of the equations (6) and (7) using this value p. Thereafter, the physical floating point register represented by this physical floating point register number is referred to.

In all the instructions which make reference to the floating point register, if the window start pointer valid register 111 is "1", conversion of the logical floating point register number to the physical floating point register number is effected in the conversion circuit 112 and if it is "0", the conversion of the logical floating point register number to the physical floating register number is not effected but the logical floating point register number designated by the instruction becomes as such the physical floating point register number. Accordingly, the physical floating point register represented by this physical floating point register number is referred to.

Here, empty bits of the existing registers for storing the control information of the data processing system may be allotted to the window start pointer valid register 111, and the value is set by the use of the existing instruction for storing the value to this register.

In the manner described above, the window start pointer set instruction, the floating point register pre-load instruction, the floating point register post-store instruction and ordinary floating point instructions under the control of the window start pointer operate.

The programs shown in FIGS. 8 and 9 can be accomplished by the embodiment described above, and the vector calculation can be sped up, as described in the item "Operation".

According to the system of the present invention, therefore, a certain floating point register number in the instruction can be converted to a different physical floating point register number by changing the window start pointer and the window stride in the instruction. In this way, a greater number of physical registers than the number of registers capable of being accessed by the instruction can be rendered accessible without changing the architecture of the data processing unit, the programs shown in FIGS. 8 and 9 can be accomplished, the drop of performance due to the delay of the execution of the instruction caused by collision of the registers can be prevented, and the program can be executed at a higher execution speed.

As can be understood particularly from the programs shown in FIGS. 8 and 9, in the vector calculation of the scientific and technological calculation primarily comprising the repetition of loops of instruction strings, the distances of the load, operation and store processing for one data on the data string can be made greater by the steps of changing the window used for each instruction, executing processing of the ith element by executing load of the ith element of the operand vector by the floating point pre-load instruction in the (i−nk)th loop, operation in the ith loop and store of the operation result in the ith element of the result storing vector by the floating point post-store instruction in the (i+nm)th loop (where nk and nm are integers which can be designated by the program), and the drop of performance by the influences of the data read time and the operation execution time can be prevented.

Further, one of the advantages of the present invention resides in that the window number for loading/storing the data can be freely decided by the window stride in the instruction in the floating point register pre-load instruction and the floating point register post-store instruction, and the system of the present invention can flexibly cope with the changes of the data read time and the operation execution time.

Another advantage of the present invention resides in that the window cut width and the register number slide quantity can be freely changed by changing the window pointer register width, so that flexible programming becomes possible.

According to the present invention, a certain floating point register number in the instruction can be changed to a different physical floating point register number by changing the window start pointer or the window stride in the instruction. Since a greater number of physical floating point registers than the number of the floating point register which can be accessed by the instruction can be made accessible by the instruction without changing the architecture of the data processing unit, the drop of performance due to data readout and the delay of the instruction execution resulting from collision of the registers can be prevented, and the program can be executed at a higher execution speed.

In the vector calculation of the scientific and technological calculation primarily comprising the repetition of the loops of the instruction strings, in particular, the distance between the load, operation and store processings for one data on the data strings can be made greater by changing the window used for each instruction, executing the processing of the ith element by executing load of the ith element of the operand vector by the floating point pre-load instruction in the (i−nk)th loop, the operation in the ith loop and store of the operation result in the ith element of the result storing vector by the floating point post-store instruction in the (i+nm)th loop (where nk and nm are integers which can be designated by the program). Accordingly, the drop of performance resulting from the influences of the data read time and the operation execution time can be prevented and a higher operation speed can be accomplished.

Since the window number for loading/storing the data can be freely decided by window stride in the floating point register pre-load instruction and the floating point register post-store instruction, the system can flexibly cope with the changes of the data read time and the operation execution time.

Furthermore, the window cut width and the register number slide quantity can be freely changed by changing the window pointer register width, and flexible programming can be made in consequence.

What is claimed is:

1. A data processing unit including a main memory for storing instructions and data, and an instruction processing unit for executing a load instruction for reading out main memory data from said main memory and storing the main memory data to a register numbered in said instruction, a store instruction for storing data from a register numbered in said instruction to said main memory, and an arithmetic instruction for executing an arithmetic operation and storing the result in a register numbered in said instruction, by the use of said main memory data stored in said main memory, said instruction processing unit comprising:

a) a greater number of physical registers than number of registers addressable by an instruction;

b) a window start pointer register for storing a number indicating the start of a range of physical registers included in a window to be accessed by said instruction, said window start pointer register includes a plurality of bits;

c) means for setting values to said window start pointer register upon receiving a window pointer set instruction for setting the value of said window start pointer register;

d) a window start pointer valid register for storing a value representing whether or not a register number is to be converted into a physical register number;

e) conversion means for determining a conversion process for converting said register number in said instruction to said physical register number based on the number stored in said window start pointer register and a value of window stride included in said instruction, said window stride representing displacement of said window from the value of said window start pointer register, and converting said register number in said instruction to said physical register number in accordance with said conversion process determined by said conversion means when the value of said window start pointer valid register represents that said physical register number is valid; and f) an instruction controller for decoding said instruction, said instruction being one of the following:
  i) a register pre-load instruction having therein said register number and said window stride, for converting said register number in said register pre-load instruction to said physical register number after said conversion is process determined based on the number stored in said window start pointer register and the value of said window stride by said conversion means, and instructing storage of main memory data to said physical register indicated by said physical register number,
  ii) a register post-store instruction having therein said register number and said window stride, for converting said register number in said post-store instruction to said physical register number after said conversion process is determined based on the number stored in said window start pointer register and the value of said window stride by said conversion means, and instructing storage of data of a physical register indicated by said physical register number into said main memory, and
  iii) said load instruction, said store instruction and said arithmetic instruction each having therein said register number, for converting said register number in said instruction to said physical register number after said conversion process is determined based on the number stored in said window start pointer register by said conversion means, and instructing one of load, store and arithmetic operations to said physical register number.

2. A data processing unit according to claim 1, wherein said register number in said instruction and said physical register are floating point registers, for exclusively storing floating point numbers.

3. A data processing unit according to claim 1, further comprising:
a cache as a buffer memory for temporarily storing a copy of the content of said main memory;

wherein said register pre-load instruction does not change the content of said cache when said main memory data is not registered to said cache, and said register post-store instruction instructs not to change the content of said cache during data write to said main memory if said main memory data of said main memory address corresponding thereto is not registered to said cache.

4. A data processing unit including a main memory for storing instructions and data, and an instruction processing unit for executing a load instruction for reading out main memory data from said main memory and storing it to a register numbered in said instruction, a store instruction for storing data from a register numbered in said instruction to said main memory, and an arithmetic instruction for executing an arithmetic operation and storing the result in a register numbered in said instruction, by use of said main memory data stored in said main memory, said instruction processing unit comprising:

a) a greater number of physical registers than number of registers addressable by an instruction;

b) a window start pointer register for storing a number indicating the start of a range of physical registers included in a window to be accessed by said instruction, said window start pointer register includes a plurality of bits;

c) means for setting values to said window start pointer register upon receiving a window pointer set instruction for setting the value of said window start pointer register;

d) a window start pointer valid register for storing a value representing whether or not a register number is to be converted into a physical register number;

e) conversion means for determining a conversion process for converting said register number in said instruction to said physical register number based on the number stored in said window start pointer register and a value of window stride included in said instruction, said window stride representing displacement of said window from the value of said window start pointer register, and converting said register number in said instruction to said physical register number in accordance with said conversion process determined by said conversion means, when the value of said window start pointer valid register represents that said physical register number is valid; and f) an instruction controller for decoding said instruction, said instruction being one of the following:
  i) a register pre-load instruction having therein said register number and said window stride, for converting said register number in said register pre-load instruction to said physical register number after said conversion process is determined based on the number stored in said window stride by said conversion means, and instructing storage of said main memory data to said physical register indicated by said physical register number,
  ii) a register post-store instruction having therein said register number and said-window stride, for converting said register number in said register post-store instruction to said physical register number after said conversion process is determined based on the number stored in said window start pointer register and the value of said window stride by said conversion means, and instructing storage of data of said physical register indicated by said physical register number into said main memory and iii) said load instruction, said store instruction and said arithmetic instruction each having therein said register number, for converting said register number in said instruction to said physical register number after said conversion process is determined based on the number stored in said window start pointer register by said conversion means, and instructing one of load, store and arithmetic operations to said physical register number; and wherein, said physical register number corresponds to one of physical registers, the bit number of said window start pointer register, as a window start pointer register width, a certain integer value greater than said window start pointer register width, as a pointer width maximum value, the power of 2 using, as an index, the value obtained by subtracting said window start pointer register width from said pointer width maximum value, as a window cut width, and the quotient obtained by dividing said number of registers by said window cut width, as the number of windows, during conversion from the register number to said physical register number is the instruction by said conversion means, said register number in said register pre-load instruction is converted to said physical register number expressed by the sum obtained by adding said register number in said instruction to a value of a register number slide quantity, obtained by multiplying the window cut width by a value of a window number, obtained by adding the value of said window start pointer register to said window stride value in the instruction by using said window number as a modulus, said register number in said register post-store instruction is converted to said physical register number expressed by said sum of the register number in the instruction and a value of a register number slide quantity, obtained by multiplying said window cut width by a value of a window number, obtained by subtracting the value of said window stride in said instruction from the value of said window start pointer register by using said window number as a modulus and said register number in said load instruction, said store instruction and said arithmetic instruction is converted to said physical register number expressed by the sum of said register number in the instruction and a value of register number slide quantity, obtained by multiplying said window cut width by a value of window number, obtained by converting the value of said window start pointer register using said window number as a modulus.

5. A data processing unit according to claim 4, wherein said window cut width is made variable by rendering said pointer width maximum value or said window start pointer register width variable.

6. A data processing unit according to claim 4, further comprising:

a cache as a buffer memory device for temporarily storing a part of the content of said main memory;

wherein, when said main memory data is not registered to said cache, said register pre-load instruction does not change the content of said cache, and when said main memory data of a corresponding main memory address is not registered to said cache during data write to said main memory, said register post-store instruction instructs not to change the content of said cache.

7. A data processing unit according to claim 4, wherein the number of said physical registers is the power of 2 using said pointer width maximum value as an index.

8. A data processing unit according to claim 7, wherein said window cut width is made variable by rendering said pointer width maximum value or said window start pointer register width variable.

9. A data processing unit including a main memory for storing instructions and data, and an instruction processing unit for executing a load instruction for reading out main memory data from said main memory and storing it to a register numbered in said instruction, a store instruction for storing data from a register numbered in said instruction to said main memory, and an arithmetic instruction for executing an arithmetic operation and storing the result in a register numbered in said instruction, by the use of said main memory data stored in said main memory, said instruction processing unit comprising:

a) a greater number of physical registers than number of registers addressable by an instruction;

b) a window start pointer register for storing a number indicating the start of a range of physical registers included in a window to be accessed by said instruction, said window start pointer register includes a plurality of bits;

c) means for setting values to said window start pointer register upon receiving a window pointer set instruction for setting the value of said window start pointer registers;

d) a window start pointer valid register for storing a value representing whether or not a register number is to be converted into a physical register number;

e) conversion means for determining a conversion process for converting said register number in said instruction to said physical register number based on the number stored in said window start pointer register and a value of window stride included in said instruction, said window stride representing displacement of said window from the value of said window start pointer register, and converting said register number in said instruction to said physical register number in accordance with said conversion process determined by said conversion means, when the value of said window start pointer valid register represents that said physical register number is valid; and f) an instruction controller for decoding said instruction, said instruction being one of the following;

i) a register pre-load instruction having therein said register number and said window stride, for converting said register number in said register pre-load instruction to said physical register number after said conversion process is determined based on the number stored in said window stride by said conversion means, and instructing storage of said main memory data to said physical register indicated by said physical register number, ii) a register post-store instruction having therein said register number and said window stride, for converting said register number in said register post-store instruction to said physical register number after said conversion process is determined based on the number stored in said window start pointer register and the value of said window stride by said conversion means, and instructing storage of data of said physical register indicated by said physical register number into said main memory, and iii) said load instruction, said store instruction and said arithmetic instruction each having therein a register number, for converting said register number in said instruction to said physical register number after said conversion process is determined based on the number stored in said window start pointer register by said conversion means, and instructing one of load, store and arithmetic operations to said physical register number; and wherein said conversion means converts a register number having a predetermined value among said register number in said instruction to said physical register number having the same value as said predetermined value of a global register number irrespective of a conversion process determined by the value of said window start pointer register and the value of said window stride in said instruction.

10. A data processing unit according to claim 9, wherein, when the difference obtained by subtracting the number of said global registers from the number of said physical registers is defined as a local register number; the bit number of said window start pointer registers, as a window start pointer register width; a certain integer value greater than said window start pointer register width, as a pointer width maximum value; the power of 2 using, as an index, the difference obtained by subtracting said window start pointer register width from said pointer width maximum value, as a window cut width; and the quotient obtained by dividing said local register number by said window cut width, as a window number, in the conversion of said register number in said instruction to said physical number; said conversion means converts, the register number in each of said register pre-load instruction, said register store instruction, said load instruction, said store instruction and said arithmetic instruction to a physical register number of a global register number having the same value as the value of said register number, when the register number in said instruction is said predetermined value;

the register number in said instruction to a physical register number expressed by the sum of the register number in said instruction and a value of register number slide quantity, obtained by multiplying said window cut width by a value of a window number, obtained by adding the value of said window start pointer register and the value of said window stride in said instruction by using said window number as a modulus in said register pre-load instruction;

the register number in said instruction to a physical register number expressed by the sum of the register number in said instruction and a value of a register number slide quantity, obtained by multiplying said window cut width by a value of a window number, obtained by subtracting the value of said window stride in said instruction from the value of said window start pointer register by using said window number as a modulus, in said register post-store instruction; and the register number in said instruction to a physical register number expressed as the sum of the register number in said instruction and a value of a register number slide quantity, obtained by multiplying said window cut width by a value of a window number, obtained the value of said window start pointer register by using said window number as a modulus in said load instruction, said store instruction and said arithmetic instruction.

11. A data processing unit according to claim 10, wherein said window cut width is made variable by rendering said pointer maximum value or said window start pointer register width variable.

12. A data processing unit according to claim 10, further comprising:

a cache as a buffer memory device for temporarily storing a part of the content of said main memory;

wherein, when said main memory data is not registered to said cache, said register pre-load instruction does not change the content of said cache, and when said main memory data of a corresponding main memory address is not registered to said cache during data write to said main memory, said register post-store instruction instructs not to change the content of said cache.

13. A data processing unit according to claim 10, wherein the number of said physical registers is the power of 2 using said pointer width maximum value as an index.

14. A data processing unit according to claim 13, wherein said window cut width is made variable by rendering said pointer width maximum value or said window start pointer register width variable.

15. A data processing unit including a main memory for storing instructions and data, and an instruction processing unit for executing a load instruction for reading out main memory data from said main memory and storing it to a register numbered in said instruction, a store instruction for storing data from a register numbered in said instruction to said main memory, and an arithmetic instruction for executing an arithmetic operation and storing the result in a register numbered in said instruction, by use of said main memory data stored in said main memory, said instruction processing unit comprising:

a) a greater number of physical registers than number of registers addressable by an instruction;

b) a window start pointer register for storing a number indicating the start of a range of physical registers included in a window to be accessed by said instruction, said window start pointer register comprising a plurality of bits;

c) means for setting values to said window start pointer register upon receiving a window pointer set instruction for setting the value of said window start pointer register;

d) conversion means for converting a register number in said instruction to a physical register number based on the number stored in said window start pointer register, a value of window stride included in said instruction representing displacement of said window from the value of said window start pointer register, and window cut width indicating how far apart the adjacent windows are apart from each other in the physical registers; and e) an instruction controller for decoding said instruction and controlling execution of said instruction based on said decoding, said instruction being one of the following:

i) a register pre-load instruction having therein said register number and said window stride, for converting said register number in said register pre-load instruction to said physical register number based on the number stored in said window start pointer register, the value of said window stride and said window cut width, by said conversion means, and instructing storage of said main memory data to said physical register indicated by said physical register number, ii) a register post-store instruction having therein said register number and said window stride, for converting said register number in said register post-store instruction to said physical register number based on the number stored in said window start pointer register, the value of said window stride and said window cut width, by said conversion means, and instructing storage of data of said physical register indicated by said physical register number into said main memory, and iii) said load instruction, said store instruction and said arithmetic instruction each having therein said register number, for converting said register number in said instruction to said physical register number based on the number stored in said window start pointer register and said window width by said conversion means, and instructing one of load, store and arithmetic operations to said physical register number.

16. A data processing unit according to claim 15, wherein said conversion means obtains a first value by adding the value of said window start pointer register to the value of said window stride, obtains a second value by multiplying the first value by said window cut width, and obtains the physical register number by adding the second value to said register number in said instruction.

* * * * *